United States Patent

Selivanov

Patent Number: 6,019,499
Date of Patent: Feb. 1, 2000

[54] METHOD OF CONDITIONING HYDROCARBON LIQUIDS AND AN APPARATUS FOR CARRYING OUT THE METHOD

[75] Inventor: Nikolai I. Selivanov, Ekaterinburg, Russian Federation

[73] Assignee: Advanced Molecular Technologies, LLC, Westlake Village, Calif.

[21] Appl. No.: 08/945,130

[22] PCT Filed: Apr. 18, 1995

[86] PCT No.: PCT/RU95/00071

§ 371 Date: Oct. 16, 1997

§ 102(e) Date: Oct. 16, 1997

[87] PCT Pub. No.: WO96/33011

PCT Pub. Date: Oct. 24, 1996

[51] Int. Cl.$^7$ .................................................. B01F 7/28
[52] U.S. Cl. ........................................ 366/305; 366/171.1
[58] Field of Search .................................. 366/305, 304, 366/315, 316, 263, 262, 265, 169.1, 167.1, 170.4, 171.1

[56] References Cited

U.S. PATENT DOCUMENTS

| 797,847 | 8/1905 | Gilroy . |
| 823,856 | 6/1906 | Gilroy . |
| 1,338,996 | 5/1920 | Norcross . |

(List continued on next page.)

FOREIGN PATENT DOCUMENTS

| 667 386 | 2/1992 | European Pat. Off. . |
| 419065 | 2/1967 | France . |
| 4308842A1 | 9/1994 | Germany . |

(List continued on next page.)

OTHER PUBLICATIONS

"Ultrasonic Visbreaking of Athabasca Bitumen" by Chakma and F. Berruti; Department of Chemical and Petroleum Engineering, The University of Calgary, Calgary, Alberta, Canada T2N 1N4. From: HeavyCrude and Tar Sands: Hydrocarbons for the 21st Century, 5th UNITAR International Conference Held Aug. 4–9, 1991.

"Upgrading of Heavy Oil Via Interfacial Hydrogenation Under Cavitation Conditions" by Teh Fu Yen and Jiunn–Ren Lin; School of Engineering, University of Southern CAlifornia, Los Angeles, CA. From: Heavy Crude and Tar Sands: Hydrocarbons for 21st Century, 5th UNITAR International Conference Held Aug. 4–9, 1991.

"Enhancement of Bitumen Separation from Tar Sand by Radicals in Ultrasonic Irradiation" by J.F. Kuo, K. Sadeghi, L.K. Jang, M.A. Sadeghi, and T.F. Yen School of Engineering University of Southern California Los Angeles, CA 90089–0231.

Primary Examiner—Tony G. Soohoo
Attorney, Agent, or Firm—Henry G. Kohlmann

[57] ABSTRACT

Method and device (FIG. 1) for conditioning of hydrocarbon fluids before their fractioning by means of mechanical vibrations comprise the supply of fluid into the space (1) of the rotating working wheel (2), discharge of fluid into the circular chamber (4), formed by the working wheel and the stator (7) through a series of outlet openings (8), and outflow of fluid. During this, preferred empirical relationships are observed:

$R = 1.1614\,K$ (mm), $\Delta R = 1.1614\,B$ (mm)

and $n = 3.8396\,K^{-1.5} * 10^6$ (r.p.m.), where
R is the radius of the peripheral cylindrical surface of the working wheel,
$\Delta R$ is the radial size of the circular chamber,
n is the frequency of the working wheel rotation,
K is the number of the outlet openings of the working wheel,
B is the integer in the range of 1 through K/5.

20 Claims, 3 Drawing Sheets

U.S. PATENT DOCUMENTS

| | | | |
|---|---|---|---|
| 1,382,765 | 6/1921 | Dixon . | |
| 1,489,786 | 4/1924 | Povey . | |
| 1,489,787 | 4/1924 | Povey . | |
| 1,790,967 | 2/1931 | Auerbach . | |
| 1,873,037 | 8/1932 | Ringgenberg . | |
| 1,890,106 | 12/1932 | Biedixen . | |
| 2,009,957 | 7/1935 | Esch . | |
| 2,578,377 | 12/1951 | Smith . | |
| 2,688,470 | 9/1954 | Marco | 366/305 |
| 2,748,762 | 6/1956 | Booth . | |
| 3,194,540 | 7/1965 | Hager . | |
| 3,195,867 | 7/1965 | Mould, Jr. | 366/305 |
| 3,268,432 | 8/1966 | Nance . | |
| 3,284,056 | 11/1966 | McConnaughay . | |
| 3,497,005 | 2/1970 | Pelopsky . | |
| 3,614,069 | 10/1971 | Murry . | |
| 3,616,375 | 10/1971 | Inoue . | |
| 3,630,866 | 12/1971 | Pelofsky . | |
| 3,679,182 | 7/1972 | Clocker . | |
| 3,744,763 | 7/1973 | Schnoring . | |
| 3,809,017 | 5/1974 | Eskeli . | |
| 3,902,549 | 9/1975 | Opfermann . | |
| 3,915,858 | 10/1975 | Condolios . | |
| 3,926,010 | 12/1975 | Eskeli . | |
| 3,933,007 | 1/1976 | Eskeli . | |
| 4,136,971 | 1/1979 | Varlamov et al. | 366/305 |
| 4,172,668 | 10/1979 | Thompson . | |
| 4,256,085 | 3/1981 | Line . | |
| 4,294,549 | 10/1981 | Thompson . | |
| 4,295,600 | 10/1981 | Saget . | |
| 4,391,608 | 7/1983 | Dondelewski . | |
| 4,590,918 | 5/1986 | Kuboyama . | |
| 4,664,068 | 5/1987 | Kretchmar . | |
| 4,750,843 | 6/1988 | Endtner . | |
| 4,798,176 | 1/1989 | Perkins . | |
| 4,810,240 | 3/1989 | Zuccato . | |
| 4,915,509 | 4/1990 | Sauer . | |
| 4,936,821 | 6/1990 | Zuccato . | |
| 4,938,606 | 7/1990 | Kunz . | |
| 4,992,614 | 2/1991 | Rodewald . | |
| 5,020,916 | 6/1991 | Fritsch . | |
| 5,104,541 | 4/1992 | Daniel . | |
| 5,110,443 | 5/1992 | Gregoli . | |
| 5,125,367 | 6/1992 | Ulrich . | |
| 5,184,678 | 2/1993 | Pechkov . | |
| 5,276,248 | 1/1994 | Engelhardt . | |
| 5,341,768 | 8/1994 | Pope . | |
| 5,392,737 | 2/1995 | Newman, Sr. . | |
| 5,419,306 | 5/1995 | Huffman . | |
| 5,500,117 | 3/1996 | Hamdan . | |
| 5,531,157 | 7/1996 | Probst . | |
| 5,547,563 | 8/1996 | Stowe . | |
| 5,711,262 | 1/1998 | Ban . | |
| 5,718,193 | 2/1998 | Ban . | |
| 497028 | 12/1975 | U.S.S.R. . | |
| 986475 | 1/1983 | U.S.S.R. . | |
| 1047491 | 10/1983 | U.S.S.R. . | |
| 1236287 | 6/1986 | U.S.S.R. . | |
| 191472 | 1/1923 | United Kingdom . | |
| 1303823 | 1/1973 | United Kingdom . | |
| 2044794A | 10/1980 | United Kingdom . | |
| 94/09894 | 5/1994 | WIPO . | |

METHOD OF CONDITIONING HYDROCARBON LIQUIDS AND AN APPARATUS FOR CARRYING OUT THE METHOD

CROSS-REFERENCE TO RELATED APPLICATION

This application is a U.S. national application corresponding to PCT application number PCT/RU/00071 having a priority date of Apr. 18, 1995.

BACKGROUND OF THE INVENTION

The present invention has to do with the technology for preparing hydrocarbon liquids for their further processing. More immediately, the invention has to do with a method and a device for preliminary conditioning of hydrocarbon liquids before their subsequent fractionating, produced by means of processing them with the aid of mechanical effects. The term "conditioning" as used herein refers to the imparting to the raw material physical properties that are favorable with a view to its further processing.

From the current state of technology we are broadly familiar with the methods of preliminarily conditioning a hydrocarbon liquid raw material prior to its fractionating, produced by means of processing it with the aid of mechanical effects, specifically, by means of preliminary filtration from undesirable impurities. Such processing facilitates the process of subsequent fractionating, but has no effect on the physical properties of the initial hydrocarbon raw material or semi-finished product and on the outcome of the intermediate or final fractions.

Also well-known at the current level of technology is a method of processing a liquid by means of mechanical vibrations (International Patent Registration No. PCT/RU92/00194 of 1992), that involves the injection of the liquid to be processed into the cavity of a revolving rotating wheel; the expulsion of the liquid from the cavity of the rotating wheel through a series of outlet apertures on its peripheral cylindrical surface; the injection of the liquid into a cavity of the stator through at least one inlet aperture in the concentric surface of the stator lying as close as possible to the peripheral cylindrical surface of the rotating wheel; during which there occur periodic abrupt interruptions in the flows of the liquid emanating from the outlet apertures of the rotating wheel, that serve to activate or stimulate mechanical vibrations in the liquid in the sonic or ultrasonic range.

The device for implementing the described method for processing a liquid contains a rotor, including a shaft located in the bearings; a rotating wheel that is connected to the shaft and made in the form of a disk with a peripheral annular wall having cylindrical exterior and interior surfaces in which are located a series of outlet apertures for passing the liquid, which outlet apertures are uniformly arranged along the periphery; a stator in which the rotating wheel revolves or spins and that has an inlet aperture for feeding in the liquid and an outlet aperture for expelling the liquid, and two concentric walls that from both sides come as close as possible to the peripheral annular wall of the rotating wheel; in both concentric walls of the stator are located at least one aperture for the passing of the liquid, which aperture is lying on a plane with the positioning of the series of apertures of the rotating wheel.

As applied to hydrocarbon liquids the method and apparatus for processing the liquids described above has no effect on their physical properties, with the exception of a certain heating thereof, nor on the intermediate or final products of the subsequent fractionating.

SUMMARY OF THE INVENTION

The goal of the present invention is to solve the problem of creating a method for conditioning hydrocarbon liquids prior to their subsequent fractionating and a device for accomplishing such conditioning that would make it possible to affect the physical properties of the hydrocarbon liquid in such a way as to increase the output of light products of fractionating.

This problem is solved according to the invention by processing the liquid with the aid of the mechanical effects on it of a process of swirling motion. This process of swirling motion has a specifically defined linear velocity on a specifically defined radius of revolution, and with the superimposition of a process of vibrations having a specifically defined frequency.

For this method of conditioning a liquid in the basic working embodiment of the invention, the liquid that is to be subject to processing is fed into the cavity of a revolving wheel; the liquid undergoing processing is expelled from the cavity of the rotating wheel into the annular chamber that is formed by its peripheral cylindrical surface and the concentric surface of the stator, through a series of outlet apertures that are located on the peripheral cylindrical surface of the rotating wheel and that are uniformly distributed along the periphery; the liquid is expelled from the annular chamber through at least one outlet aperture. As this takes place, the radius R of the peripheral cylindrical surface of the rotating wheel and the frequency or rate of its revolutions n is determined by the number K of outlet apertures chosen for the rotating wheel in a range corresponding to the empirical relationships $$R = (1.05 \ldots 1.28) K \text{ (mm)}$$

and $$n = (3.6 \ldots 4.1) K^{-1.5} \times 10^6 \text{ (revs./min)}.$$

Beyond the bounds of the indicated range of parameters, the achieved result of the conditioning of the liquid, as has been demonstrated experimentally, is expressed with inadequate precision.

In the most preferred implementation of a method for conditioning a liquid, the radius R and the rate of revolution n of the rotating wheel are defined unambiguously [i.e., identically defined-Tr.] by the selected number K of its outlet apertures, according to the empirical relationships $$R = 1.1614 K \text{ (mm)}$$

and $$n = 3.8396 K^{-1.5} \times 10^6 \text{ (revs./min.)}.$$

In another preferred implementation of a method for conditioning a liquid, the expulsion of the processed liquid from the annular chamber that is formed by the peripheral cylindrical surface of the rotating wheel and the concentric surface of the stator, is accomplished through a series of outlet apertures that are located on the concentric surface of the stator and which, during the revolution of the wheel, systematically position themselves against the outlet apertures of the rotating wheel.

In the basic embodiment of a method for conditioning a hydrocarbon liquid using the indicated ranges for selecting parameters, as has been demonstrated experimentally, an effect upon the physical properties of the liquid is in principle achieved that, during its subsequent fractionating, the output of the most valuable low-boiling fractions is significantly increased, indeed to such a degree that it is permissible to speak of a sufficiently efficient and practical application. This effect may be explained—without pretending to an exhaustive analysis of the internal physical processes involved, by the destructive transformation of the internal links of the liquid at the molecular level as a result of the periodic effects actuated in essence in mechanical fashion on the liquid at precisely defined critical frequencies, and their harmonics. In the most preferred working embodiment of a method for conditioning a liquid by selecting the indicated unambiguous values for the parameters, which have been determined experimentally, the effect of a favorable predisposition of the hydrocarbon liquid to its subsequent fractionating appears even more markedly. The other preferred working embodiment of a method for conditioning a liquid makes it possible to improve the achieved effect. This improvement is owing to the combined effect on the liquid of the vibrations occurring, first, during its expulsion through the outlet apertures of the rotating wheel into the annular chamber, and then subsequently during its expulsion from the annular chamber through the outlet apertures and onto the concentric surface of the stator.

A method for conditioning hydrocarbon liquids in accord with the invention may be effected only with the aid of the device described hereinafter. This device constitutes an integral part of the whole inventor's plan and is not designed to be used for any other purposes.

The device for conditioning of a liquid in the basic working embodiment contains a rotor, including a shaft located in the bearings; at least one rotating wheel that is linked with the shaft and made in the form of a disk with a peripheral annular wall having a cylindrical exterior surface in which are arranged a series of outlet apertures for the liquid, which apertures are uniformly distributed along the periphery; a stator in which to spin the rotating wheel and which has an inlet aperture for supplying the liquid and an outlet aperture for expelling the liquid; a cavity for the liquid undergoing processing that is formed from the disk and the peripheral annular wall of the rotating wheel and the wall of the stator with an inlet aperture adjacent to it; an annular chamber for processing the liquid which is constrained in its radial direction by the peripheral annular wall of the rotating wheel and the concentric wall of the stator and connected up to the outlet aperture for expelling the liquid; in which case, the characteristic geometrical dimensions of the rotating wheel and of the annular chamber come to:

$$R = (1.05 \ldots 1.28)\, K \text{ (mm)},$$

where
K—is the selected number of outlet apertures of the rotating wheel,
R—is the radius of the cylindrical exterior surface of the peripheral annular wall of the rotating wheel, and $$\Delta R = (1.05 \ldots 1.28)\, B \text{ (mm)},$$

where
B—is the selected integer in the range of $1 \ldots K/2$,
$\Delta R$—is the radial dimension of the annular chamber.

In the most preferred working embodiment of the device for conditioning a liquid, the radius R and the dimension $\Delta R$ amount to correspondingly:

$$R = 1.1614\, K \text{ (mm)},$$

$$\Delta R = 1.1614\, B \text{ (mm)},$$

where
B—is the selected integer in the range of $1 \ldots K/5$.

In the other preferred working embodiment of the device for conditioning a liquid, the stator has a cavity that is adjacent to its concentric wall for receiving the liquid from the annular chamber, which latter is connected up with the outlet aperture for expelling the liquid; in which case, the cavity of the stator is connected with the annular chamber by outlet apertures that are located on the concentric wall of the stator on a plane with the positioning of the outlet apertures of the rotating wheel and that are uniformly distributed along the periphery; the number of outlet apertures of the annular chamber is represented by $1 \ldots K$.

Other peculiarities of the invention become evident from the more detailed descriptions of examples of it that follow hereinafter.

BRIEF DESCRIPTION OF THE DRAWINGS

The invention is explained in greater detail below by the practical examples resulting from it that are illustrated schematically by drawings, in which are presented.

DETAILED DESCRIPTION OF THE INVENTION

Figure 1:
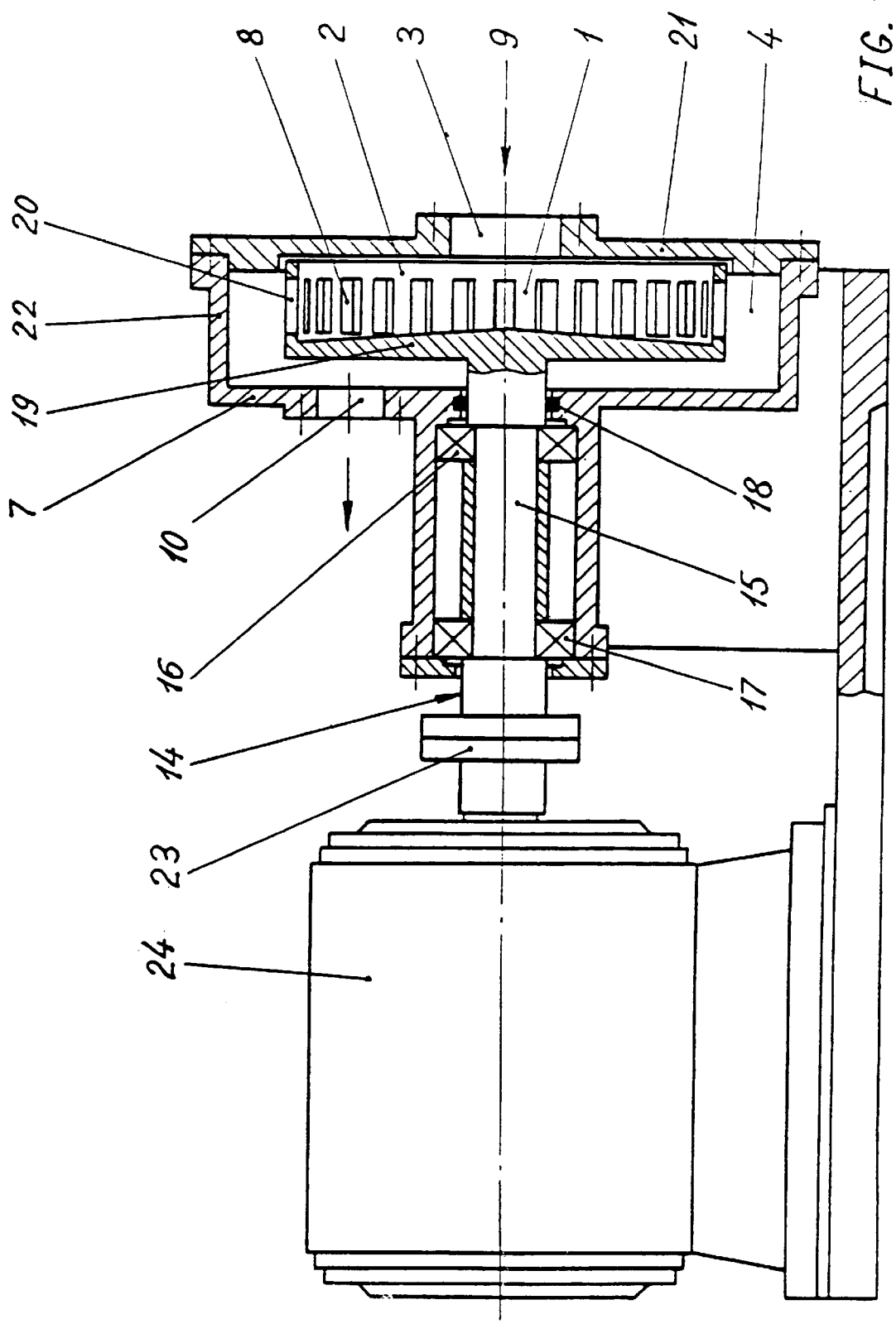
FIG. 1—a longitudinal axial section of the device for the processing of a liquid using the basic and most preferred working embodiment.

In accord with the basic working embodiment (FIGS. 1,2) of the method for conditioning a hydrocarbon liquid with the aid of mechanical effects, the liquid to be subject to processing is fed into the cavity 1 of the revolving rotating wheel 2 through an inlet aperture 3. While the rotating wheel 2 is revolving, the liquid undergoing processing is expelled from its cavity 1 into the annular chamber 4 that is formed by the peripheral cylindrical surface 5 of the rotating wheel 2 and of the concentric surface 6 of the stator 7, through a series of outlet apertures 8, that are arranged on the peripheral cylindrical surface 5 of the rotating wheel 2 and that are uniformly distributed along the periphery. Within the boundaries of the annular chamber 4, the liquid undergoing processing—while continuing to swirl around relative to the central axis 9 according to the law of free flows—is subject to the effect of mechanical vibrations conditioned by the interaction of the elementary streams of liquid flowing out of each outlet aperture 8 of the rotating wheel 2 with the concentric surface 6 of the stator 7. The processed liquid is expelled out of the annular chamber 4 through the outlet aperture 10.

The radius R of the peripheral cylindrical surface 5 and the rate of revolution n of the rotating wheel 2 are determined by the selection of the number K of the outlet apertures 8 of the rotating wheel 2 in a range in accord with the empirical relationships:

$$R = (1.05 \ldots 1.28)\, K \text{ (mm)},$$

$$n = (3.6 \ldots 4.1)\, K^{-1.5} \times 10^6 \text{ (revs./min)}.$$

In accord with the most preferred method for conditioning a liquid, the radius R and the rate of revolution n of the rotating wheel 2 are unambiguously defined by the number K of outlet apertures 8 selected for the rotating wheel 2, in accordance with the empirical relation:

$$R=1.1614\ K\ (\text{mm}),$$

$$n=3.8396\ K^{-1.5} \times 10^6\ (\text{revs./min.}).$$

In accord with another preferred working embodiment (FIGS. 3,4) of a method for conditioning a liquid, the expulsion of the liquid undergoing processing from the annular chamber 4 that is formed from the peripheral cylindrical surface 5 of the rotating wheel 2 and the concentric surface 6 of the stator 7, is accomplished by one, several or a whole series of outlet apertures 11 on the concentric surface 6 of the stator 7. These outlet apertures 11 of the annular chamber 4 during the revolutions of the rotating wheel 2 systematically position themselves against the corresponding outlet apertures 8 of the rotating wheel 2, [thereby] stimulating periodic perturbation of the stream and corresponding mechanical vibrations in the liquid. The liquid, proceeding through the outlet apertures 11 of the annular chamber 4, arrives in the cavity 12 of the stator 7, from whence the processed liquid is expelled through the outlet aperture 13.

The number of outlet apertures 11 of the annular chamber 4 is selected from a range of from one to K. However, it must be borne in mind in this case that, all other conditions remaining the same, an increase in the number of outlet apertures 11, while it adequately increases the volumetric output of the process, also lowers the effectiveness of the conditioning of the liquid, in terms of a solution of the problem offered by the invention.

In accord with the basic working embodiment (FIGS. 1,2) of the device for bringing about the described method of conditioning a liquid, it contains a rotor 14, which includes a shaft 15 located in the bearings 16 and 17 and equipped with a gasket 18. The rotor 14 contains at least one rotating wheel 2 connected with the shaft 15 and made in the form of a disk 19 with a peripheral annular wall 20, which annular wall has a cylindrical external surface 5. In this wall 20 are located a series of outlet apertures 8 for the liquid, uniformly distributed along the periphery.

The stator 7, in which the rotating wheel 2 revolves, has an inlet aperture 3 for supplying the liquid for processing and an outlet aperture 10 for expelling the processed liquid. A cavity 1 for receiving the liquid to undergo processing is formed by the disk 19 and the annular wall 20 of the rotating wheel 2 and the wall 21 of the stator 7 that is adjacent to it and has the inlet aperture 3. The annular chamber 4 for receiving the liquid undergoing processing is constrained in a radial direction by the annular wall 20 of the rotating wheel 2 and the concentric wall 22 of the stator 7 and connected up to the outlet aperture 10 for expelling the processed liquid.

The characteristic geometrical dimensions of the rotating wheel 2 and of the annular chamber 4 come to:

$$R=(1.05\ldots 1.28)\ K\ (\text{mm}),$$

$$\Delta R=(1.05\ldots 1.28)\ B\ (\text{mm}),$$

where
K—is the number of outlet apertures selected for the rotating wheel, and
R—is the radius of the cylindrical exterior surface of the peripheral annular wall of the rotating wheel,
B—is the integer selected in the range of 1 . . . K/2, and
ΔR—is the radial dimension of the annular chamber.

In the most preferred working embodiment (FIGS. 1,2) of the device for conditioning a liquid, the nominal size of the radius R unequivocally comes to $$R=1.1614\ K\ (\text{mm}),$$

Whereas the nominal radial dimension ΔR comes to $$\Delta R=1.1614\ B\ (\text{mm}),$$

where
B—is the integer selected in the range of 1 . . . K/5.

In accord with another preferred working embodiment (FIGS. 3,4) of the device for conditioning a liquid, the stator 7 has a cavity 12 adjacent to its concentric wall 22 for receiving the liquid from the annular chamber 4 and it is connected up with an outlet aperture 13 for expelling the processed liquid. The cavity 12 of the stator 7 is connected to the annular chamber 4 by outlet apertures 11 for expelling the liquid from the annular chamber 4 and simultaneously for its injection into cavity 12, which outlet apertures are located in the concentric wall 22 of the stator 7. These outlet apertures 11 are located on a plane with the positioning of the series of outlet apertures 8 of the rotating wheel 2 and uniformly distributed along the periphery. The number of apertures 11 amounts to from one to K, although their number beyond K is not useful given the marked decrease, all other things being equal, of the intensity of the vibrating process [which results].

The rotor 14 is connected by means of the shaft 15 and the coupling or socket 23 with the means for driving it at a designated rate of revolution, for example, with an electric motor 24.

The rotor may contain several rotating wheels located on one shaft which are systematically interconnected downstream in the liquid. Each rotating wheel may be equipped with blades.

A by-pass passageway with a shut-off regulating element, for both internal and external use, may be envisaged for the return injection or re-supply of a part of the processed liquid from the outlet of the device back to its inlet, so as to repeat the processing.

The device as a whole may take up any spatial location.

The number K of outlet apertures 8 of the rotating wheel 2 is selected depending upon the desired rate of required vibrations to be activated in the liquid within the sonic range, which is determined by the empirical relation $$F=63.993\ K^{-0.5}\ (\text{kHz}),$$

based on the already achieved and expedient geometrical dimensions of the device as a whole.

The size of the parameter B is selected within the range indicated earlier. This range is dependent upon the physical nature of liquid that is to be subject to processing in a given instance, especially upon its viscosity and the character of the changes it undergoes under heat, based on the admissible or tolerable geometrical dimensions of the device as a whole.

The number of outlet apertures 11 for expelling the liquid from the annular chamber 4 is selected depending upon the desired ratio of the volume of output to the acceptable degree of conditioning.

Figure 3:
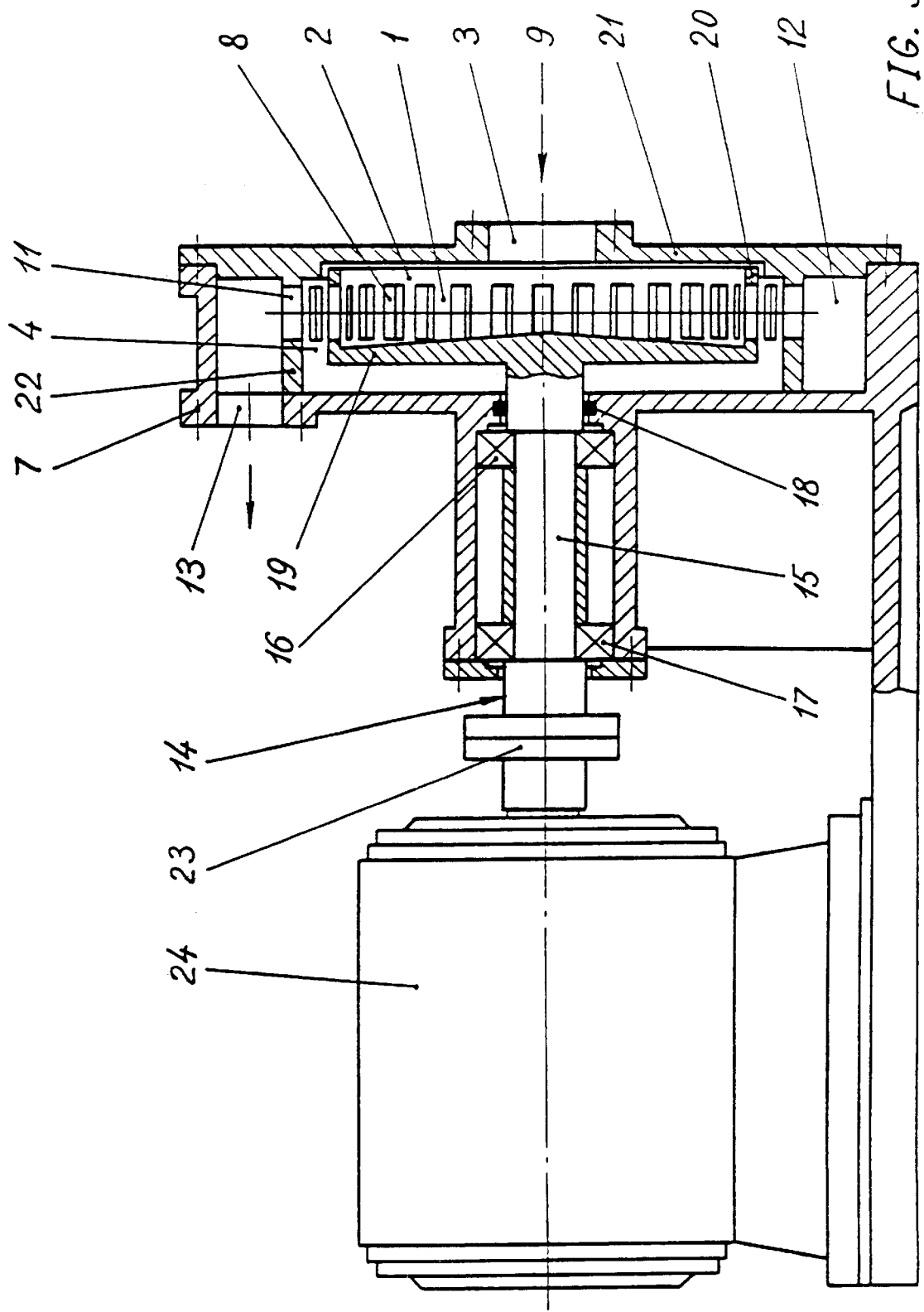
FIG. 3—a longitudinal axial section of the device for processing the liquid in one of the preferred working embodiments.

The width of the outlet apertures 8 of the rotating wheel 2 in the circumferential direction to its peripheral surface 5 preferably amount to one half of its circumferential pitch on the periphery of the radius R. The width of the outlet apertures 11 of the annular chamber 4 in the circumferential direction to its concentric surface 6, irrespective of their number, preferably should not exceed the width of the outlet apertures 8. The preferred unique form of apertures 8 and 11, drawn in a direction parallel to the central axis 9, is such as illustrated in the drawings of FIGS. 1 and 3.

The device for conditioning a liquid in accord with the invention operates in the following fashion:

In the basic and most preferred working embodiment of the device (FIGS. 1,2) the liquid to be processed is fed through an inlet aperture 3 into cavity 1 of the rotating wheel 2 in the direction as indicated by the arrow. The rotor 14 along with the rotating wheel 2 is made to revolve with the aid of an electric motor 24 via a coupling or socket 23 and a shaft 15 at a designated rate of revolution n. At the same time, the liquid that is coming into the cavity 1 of the rotating wheel 2 is expelled under pressure from the cavity 1 through a series of outlet apertures 8 in the peripheral annular wall 20 of the rotating wheel 2, arriving thereby into the annular chamber 4, that is constrained by the annular wall 20 of the rotating wheel 2 and by the concentric wall 22 of the stator 7. From the annular chamber 4 the processed liquid is discharged for further processing by fractionating through outlet aperture 10 in the direction shown by the arrow.

In another preferred working embodiment (FIGS. 3,4), the device operates similarly to that described above, with this exception that the liquid undergoing processing exits from the annular chamber 4 into the cavity 12 of the stator 7 through outlet apertures 11 in the concentric wall 22 of the stator 7. From cavity 12 the processed liquid is discharged from cavity 12 for additional processing with the aim of fractionating through an outlet aperture 13 in the direction indicated by the arrow.

The concrete examples of practical implementations of the corresponding invention of a method for conditioning a liquid and a device for its implementation are presented in (Tables 1 and 2) below. In this case, the relative increase of output of light products (gasoline, kerosene, diesel fuel) during fractionating of the source or underlying hydrocarbon liquid is seen to depend upon the effectiveness of the conditioning. In the examples cited, the effectiveness of the conditioning is determined by means of the conversion into underlying hydrogenous raw materials (crude oil) of additional withdrawals of light fractions from the fuel oil that are subject to distillation after conditioning, and produced in accordance with the invention.

TABLE 1

Figure 2:
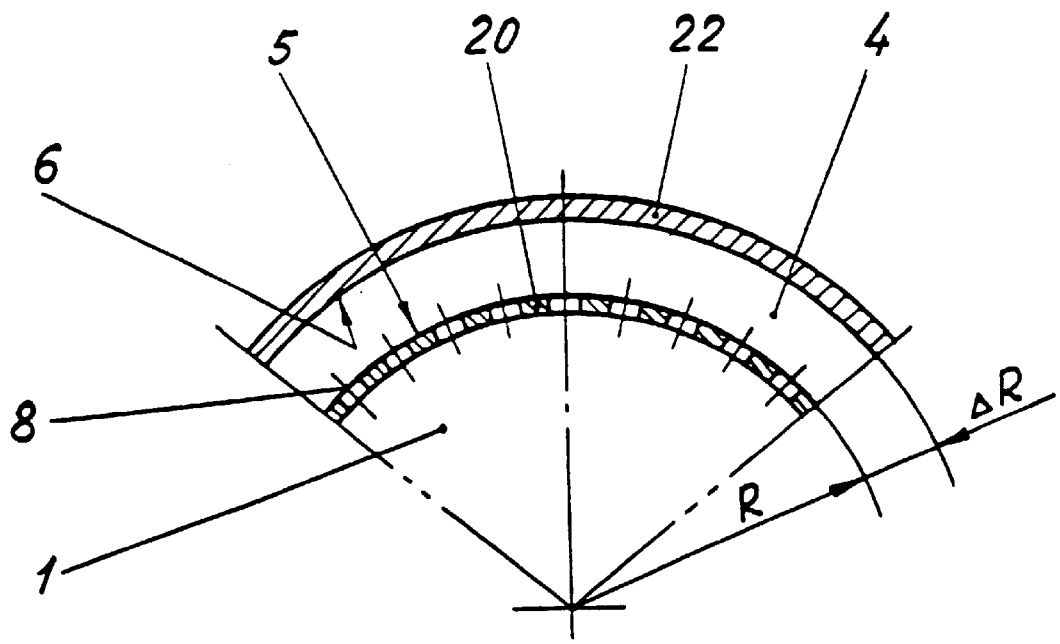
FIGS. 2, 4—a partial cross section of the annular chamber.

Embodiments implemented in accord with FIGS. 1, 2.
Liquid undergoing processing - fuel oil.

| Name | Symbol | Scale | Quantity |
| --- | --- | --- | --- |
| Number of outlet apertures on the rotating wheel | K | Pieces | 120 |
| Radius of the peripheral cylindrical surface of the rotating wheel | R | mm<br>inches | 140.0<br>5.512 |
| Radial size of the annular chamber | ΔR | mm<br>inches | 9.3<br>0.366 |
| Frequency of revolution of the rotating wheel | n | revolutions/min. | 2920 |
| Frequency of mechanical vibrations | F | kHz | 5.840 |
| Supplied energy | E | Megajoules | 46.8 |
| Output during open circulation | G | kg/min. | 64.0 |
| Effectiveness of the conditioning during open circulation | — | % | 1.3 |
| Output when the circulation is closed by 50% | $G_1$ | kg/min. | 32.0 |
| Effectiveness of the conditioning when the circulation is closed by 50% | — | % | 2.5 |

TABLE 2

Figure 4:
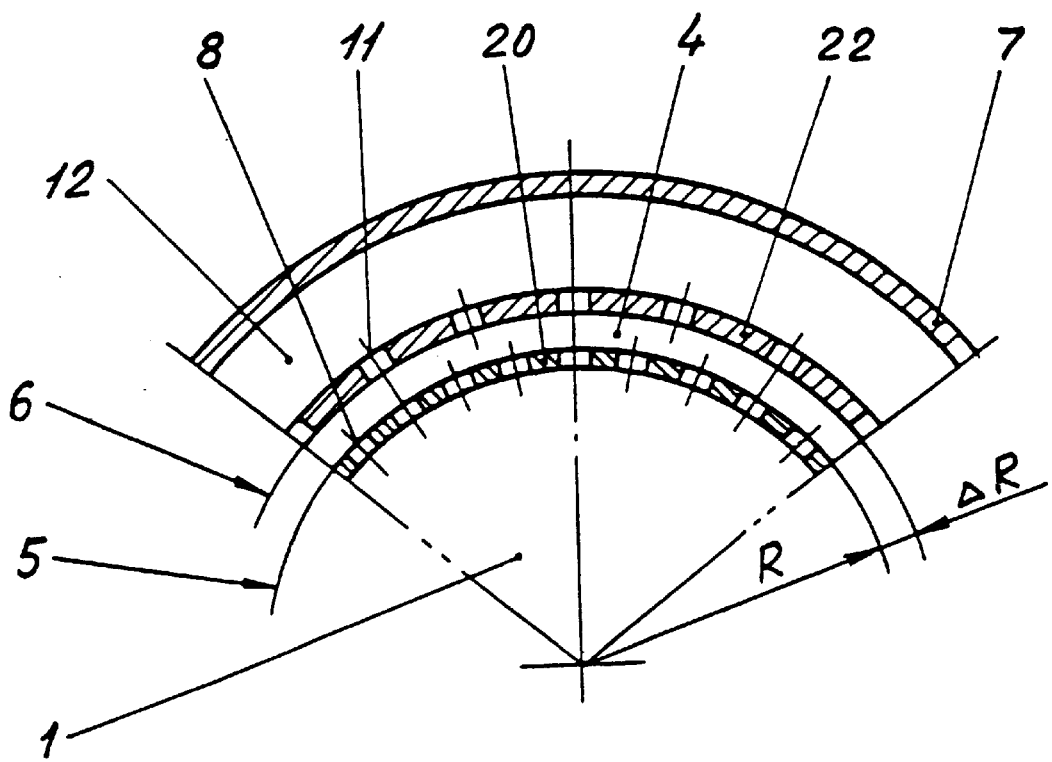

Embodiments implemented in accord with FIGS. 3, 4.
Liquid undergoing processing - fuel oil.

| Name | Symbol | Scale | Quantity |
| --- | --- | --- | --- |
| Number of outlet apertures on the rotating wheel | K | Pieces | 192 |
| Radius of the peripheral cylindrical surface of the rotating wheel | R | mm<br>inches | 223.0<br>8.780 |
| Radial size of the annular chamber | ΔR | mm<br>inches | 41.8<br>1.646 |
| Frequency of revolution of the rotating wheel | n | revolutions/min. | 1440 |
| Frequency of mechanical vibrations | F | kHz | 4.620 |
| Number of outlet apertures in the annular chamber | $K_I$ | pieces | 128 |
| Supplied energy | E | Megajoules | 64.8 |
| Output during open circulation | G | kg/min. | 102.8 |
| Effectiveness of conditioning during open circulation | — | % | 1.15 |
| Output when the circulation is closed by 50% | $G_I$ | kg/min. | 51.4 |
| Effectiveness of conditioning when the circulation is closed by 50% | — | % | 2.30 |

INDUSTRIAL APPLICATION

The sphere of industrial applicability of the invention includes the chemical, oil refining and other branches of industry connected with the processing of hydrocarbon liquids—as underlying raw materials, as well as semi-finished reprocessed products with the aim of conditioning them before subsequent fractionating. In particular, crude oil before distillation, fuel oil before repeated distillation or cracking, gas oil before catalytic cracking, solvent naptha [ligroin] before reforming, and the like, and also artificial hydrocarbon liquids before their corresponding fractionation may be subject to preliminary conditioning in accord with the invention. An integration of the corresponding process in accord with the invention is possible for the conventional technological purposes of fractionating under conditions of efficient combination with operations of pumping or transfer of the hydrocarbon liquids among technological items/sites.

Bringing the rotating wheel to revolve may be accomplished either by motors(electrical, hydraulic, wind-powered, mechanical, etc.) specially designed for such purposes, or by rotating parts of means of transportation for conveying hydrocarbon liquids.

I claim:

1. A method for conditioning a hydrocarbon liquid by means of processing it with the aid of mechanical effects, that includes:

a. supplying the liquid undergoing processing to a cavity of a rotating wheel, b. the expulsion of the liquid undergoing processing from the cavity of the rotating wheel into an annular chamber formed by a peripheral cylindrical surface of said wheel and a concentric surface of a stator, in which case c. the above-mentioned expulsion is accomplished through a series of outlet apertures arranged along the peripheral cylindrical surface of the rotating wheel and uniformly distributed along its periphery, and d. the discharging of the liquid from the annular chamber is effected by means of at least one outlet aperture, where e. the radius R of the peripheral surface of the rotating wheel is determined by the number K of the outlet apertures according to the empirical relation $$R=(1.05\ldots 1.28)\,K\text{ (mm)},$$

and where the rate of revolution n of the rotating wheel is determined by the aforementioned number K, according to the empirical relation $$n=(3.6\ldots 4.1)\,K^{-1.5}\times 10^6\text{ (revs./min.)}.$$

2. A method for conditioning a hydrocarbon liquid in accordance with claim 1, in which the radius R of the peripheral cylindrical surface of the rotating wheel is nominally determined by the number K of outlet apertures in accord with the empirical relation $$R=1.1614\,K\text{ (mm)},$$

and the rate of revolution n of the wheel is nominally determined by the number K, in accordance with the empirical relation $$n=3.8396\,K^{-1.5}\times 10^6\text{ (revs./min.)}.$$

3. A method for conditioning a hydrocarbon liquid in accordance with claims 1 or 2, in which the expulsion of the liquid from the annular chamber that is formed by the peripheral cylindrical surface of the rotating wheel and the concentric surface of the stator is accomplished by means of the at least one outlet aperture arranged on the concentric surface of the stator which at least one aperture periodically aligns with the outlet apertures of the wheel during rotation.

4. A device for conditioning a hydrocarbon liquid with the aid of mechanical effects, which includes:
   a. a rotor, including a shaft, installed in bearings,
   b. at least one rotating wheel attached to the shaft and made in the form of a disk with a peripheral annular wall, in which there has been placed a series of outlet apertures for the hydrocarbon liquid, which apertures are uniformly distributed along the periphery of said annular wall,
   c. a stator in which the rotating wheel to revolves, and which has an inlet aperture for receiving the liquid and an outlet aperture for expelling the liquid, and also
   d. a wheel cavity of the rotating wheel for the liquid undergoing processing communicates with the inlet aperture of the stator, and
   e. an annular chamber for the liquid undergoing conditioning that is constrained in a radial direction by the peripheral annular wall of the rotating wheel and a concentric wall of the stator, said annular chamber communicating with the outlet aperture of the stator for expelling the liquid, the characteristic geometrical dimensions of the rotating wheel and of the annular chamber are defined as follows:
      i. a radius R of the cylindrical exterior surface of the peripheral annular wall of the rotating wheel is defined by the relationship $$R=(1.05\ldots 1.28)\,K\text{ (mm)},$$

where
K—is the number of outlet apertures in the rotating wheel, and
      ii. where a radial dimension ΔR of the annular chamber is defined by the relationship $$\Delta R=(1.05\ldots 1.28)\,B\text{ (mm)},$$

where
B—is an integer selected within the range of 1 … K/2; and
   g. a means for driving the rotor at a rate of revolution n of about $$n=(3.6\ldots 4.1)\,K^{-1.5}\times 10^6\text{ (revs./min.)}.$$

5. A device for conditioning a hydrocarbon liquid in accord with claim 4, in which
   a. the stator has a stator cavity for receiving the liquid from the annular chamber communicating with the outlet aperture of the stator for expelling the liquid, said cavity of the stator communicating with the annular chamber through a plurality of outlet apertures that are arranged on the concentric wall of the stator on a plane with the positioning of the outlet apertures of the rotating wheel, and uniformly distributed along the periphery, and
   b. the number of outlet apertures of in the concentric wall of the stator which defines the outer limit of the annular chamber is an integer from 1 … K.

6. A device for conditioning a hydrocarbon liquid in accordance with claim 4, in which the radius R of the exterior surface of the peripheral annular wall of the rotating wheel nominally amounts to:

$$R=1.1614\,K\text{ (mm)},$$

where
K—is the number of outlet apertures and whereas the radial dimension ΔR of the annular chamber nominally comes to:

$$\Delta R 1.1614\,B\text{ (mm)},$$

where
B—is the integer selected in the range of 1 … K/5.

7. A device for conditioning a hydrocarbon liquid in accord with claim 6, in which
   a. the stator has a stator cavity for receiving the liquid from the annular chamber communicating with the outlet aperture of the stator for expelling the liquid, said cavity of the stator communicating with the annular chamber through a plurality of outlet apertures that are arranged on the concentric wall of the stator on a plane with the positioning of the outlet apertures of the rotating wheel, and uniformly distributed along the periphery, and
   b. the number of outlet apertures of in the concentric wall of the stator which defines the outer limit of the annular chamber is an integer from 1 … K.

8. A method conditioning of a hydrocarbon liquid by mechanical effects comprising the following steps:
   a. rotating a wheel relative to a stator, said wheel having at least one wheel cavity defined by a peripheral cylindrical surface attached to said wheel concentric with the rotational axis of said wheel, said stator communicating with a discharge aperture having at least one concentric surface concentric with said peripheral cylindrical surface of said wheel, defining an annular chamber between said at least one concentric surface and said cylindrical surface; said cylindrical surface further having a plurality of outlet apertures arranged equidistant on the periphery of said cylindrical surface, and said stator concentric surface having a plurality of outlet apertures spaced equidistant along the circumference of said concentric surface of said stator, b. introducing said hydrocarbon liquid into a said cavity of said wheel during rotation thereof, c. discharging the hydrocarbon liquid from the cavity of the wheel into said annular chamber through the plurality of outlet apertures arranged on the peripheral cylindrical surface of the wheel, d. inducing sonic vibrations in said liquid at a predetermined rotation rate of said wheel, and e. discharging the hydrocarbon liquid from said annular chamber through at least one of said outlet apertures in the concentric surface of the stator.

9. The method of conditioning a hydrocarbon liquid according to claim 8, wherein the frequency of sonic vibrations induced into the hydrocarbon liquid is approximately related to the number of outlet apertures of said wheel in accordance with the following relationship:

$$F = 63.993 \, K^{-0.5} \text{ (kHz)}$$

where F is the vibration frequency and K is the number of outlet apertures of the cylindrical surface of said wheel.

10. The method of conditioning of a hydrocarbon liquid according to claim 9, wherein the discharge of the liquid from the annular chamber formed by the peripheral cylindrical surface of the wheel and the concentric surface of the stator is effected through the discharge apertures in the stator which during rotation of the wheel sequentially oppose the outlet apertures of the wheel.

11. The method of conditioning of a hydrocarbon liquid according to claim 10, wherein the number of outlet apertures in the stator concentric surface is equal to the number of outlet apertures in the cylindrical surface of the wheel.

12. The method of conditioning of a hydrocarbon liquid according to claim 8, wherein the radius of the peripheral cylindrical surface of the rotating wheel and the rate of rotation is are related to the number of outlet apertures in the cylindrical surface of said wheel in about the following relationships:

$$R = (1.05 \ldots 1.28) \, K \text{ (mm)},$$

$$n = (3.6 \ldots 4.1) \, K^{-1.5} * 10^6 \text{ (r.p.m.)}$$

where R is the radius of the cylindrical surface of the rotating wheel and K is the number of outlet apertures of the cylindrical surface of said wheel.

13. A device for conditioning of a hydrocarbon liquid by mechanical effects, comprising a. a housing having an intake aperture for receiving the hydrocarbon liquid into said housing and a discharge aperture for discharging the hydrocarbon liquid from said housing;

b. at least one wheel, rotatably mounted in said housing and adapted for rotation comprising at least one circular disk and disposed adjacent the intake aperture of said housing, said disk having a peripheral annular wall in the form of a hollow wheel cylinder attached to the outer circumference of said disk, said first cylinder having a plurality of outlet apertures in the surface thereof spaced apart along the circumference of said cylinder, wherein a radius R of the cylindrical outer surface of the peripheral annular wall of the wheel is within the range of about $$R = (1.05 \ldots 1.28) \, K \text{ (mm)},$$

where
K is the number of the outlet apertures of the wheel, and c. a stator, said stator comprising at least one concentric surface in the form of a hollow stator cylinder with a plurality of outlet apertures equidistant along the circumference of said stator cylinder attached to said housing and disposed concentric with said wheel cylinder to form an annular chamber between said wheel and said stator cylinders, said outlet apertures of said stator communicating with the discharge aperture of the housing, wherein the radial size $\Delta R$ of the annular chamber in within the range of about $$\Delta R = (1.05 \ldots 1.28) \, B \text{ (mm)},$$

where B is the selected integer in the range of 1 ... K/2.

14. The device for conditioning of a hydrocarbon liquid according to claim 13, wherein the radius R of outer surface of the cylinder forming the peripheral annular wall of the wheel is about $$R = 1.1614 \, K \text{ (mm)},$$

where
K is the selected number of the outlet apertures of the wheel, while the maximum radial size $\Delta R$ of the annular chamber constitutes about $$\Delta R = 1.1614 \, B \text{ (mm)},$$

where
B is the selected integer in the range of 1 ... K/5.

15. The device for conditioning of hydrocarbon liquid according to claim 14 further comprising:

a. a plurality of stator concentric surfaces each having a different radii, and b. at least one of which is disposed concentric with said wheel cylinder such that the outlet apertures of said at least one stator concentric surface sequentially align with the outlet apertures of said wheel in at least one dimension on rotation of said wheel.

16. A method of sonic conditioning of a hydrocarbon liquid by mechanical effects comprising the following steps:

a. introducing said hydrocarbon liquid into a central cavity of a wheel mounted for rotation in a stator, said wheel including at least one peripheral cylindrical surface having a plurality of outlet apertures spaced equidistant along the circumference of said peripheral cylindrical surface mounted to said wheel and said stator having a concentric surface having a plurality of outlet apertures spaced equidistant along the circumference of the concentric surface of said stator and disposed adjacent said peripheral cylindrical surface of said wheel, forming an annular chamber, b. rotating said wheel to introduce said hydrocarbon liquid into said annular chamber through said outlet apertures in said periperal cylindrical surface, at a rotation rate sufficient to create sonic vibrations in said hydrocarbon liquid within said annular chamber, during rotation of said wheel, and c. discharging the hydrocarbon liquid from the annular chamber, through at least one outlet aperture in the concentric surface of the stator.

17. The method of conditioning of a hydrocarbon liquid according to claim 16 wherein the discharge of the liquid from the annular chamber is effected through a plurality of the outlet apertures of the concentric surface of the stator as the outlet apertures periodically oppose the outlet apertures of the wheel during rotation of the wheel.

18. A device for conditioning of a hydrocarbon liquid with sonic vibrations, comprising a. a housing having an intake aperture for supply of the hydrocarbon liquid and a discharge aperture for discharge of the hydrocarbon liquid, b. at least one wheel adapted for rotation comprising at least one circular disk disposed adjacent the intake aperture of said housing, said disk having a peripheral annular wall in the form of a hollow wheel cylinder attached to the outer circumference of said disk and forming at least one cavity, said wheel cylinder having a plurality of outlet apertures in the surface thereof spaced apart along the circumference of said cylinder, c. a stator, comprising at least one concentric surface in the form of a hollow stator cylinder attached to said housing and disposed concentric with said wheel cylinder to form an annular chamber between said wheel cylinder and said stator cylinder for receiving said hydrocarbon liquid, said stator cylinder having a plurality of outlet apertures equidistant along the circumference of the stator cylinder which communicate with the discharge aperture of the housing, and d. means for rotating said wheel at a rotation rate sufficient to induce sonic vibrations in the hydrocarbon liquid in said annular chamber.

19. The device for conditioning of a hydrocarbon liquid according to claim 18, wherein the wheel has at least one impeller blade thereon.

20. The device for conditioning of a hydrocarbon liquid according to claim 18, wherein the radius R of the cylindrical outer surface of the peripheral annular wall of the wheel is about $$R = 1.1614\,K\ (mm),$$

where

K is the selected number of the outlet apertures of the wheel, while the maximum radial size $\Delta R$ of the annular chamber constitutes about $$\Delta R = 1.1614\,B\ (mm),$$

where

B is the selected integer in the range of about 1 ... K/5.24.

* * * * *